United States Patent Office 2,842,550
Patented July 8, 1958

2,842,550

DESERPIDIC ACID LACTONE AND SALTS

Paul Reuben Ulshafer, Summit, N. J., assignor to Ciba Pharmaceutical Products, Inc., Summit, N. J., a corporation of New Jersey No Drawing. Application November 26, 1954
Serial No. 471,520

8 Claims. (Cl. 260—286)

The present invention relates to a new lactone which is herein designated as deserpidic acid lactone. The invention also embraces the acid addition salts of the aforesaid lactone, the novel process for the production of the new compound and the conversion thereof into deserpidic acid or its esters with alcohols, especially lower alkanols such as methanol or ethanol.

Deserpidic acid lactone has the formula

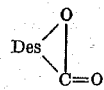

wherein "Des" stands for the organic radical of the formula $C_{20}H_{24}ON_2$ carrying the lactone grouping in deserpidic acid lactone. Deserpidic acid lactone crystallizes from methanol as needles melting at 315–318° C. and shows an optical rotation $[\alpha]_D^{25} = +12° \pm 1°$ (chloroform). The compound, when suspended in a hydrocarbon oil (Nujol), exhibits characteristic absorption bands in the infrared region of the spectrum at the following frequencies expressed in reciprocal centimeters: strong bands at 3310, 2908–2854 (Nujol), 1765, 1087, 993, 744; medium bands at 1470, 1458, 1380, 1356, 1321, 1274, 1214, 1201, 1188, 1174, 1128, 1104, 1017, 731; medium-weak bands at 1337, 1299, 1257, 1150, 1069, 1052, 689, 672; weak bands at 1621, 1591, 1495, 970, 953, 930, 899, 889, 879, 826, 792; shoulders at 1444, 1328, 1224, 1163, 1137, 1111, 1046, 1026, 757.

Deserpidic acid lactone is a valuable intermediate, for example for the preparation of deserpidic acid and its esters with alcohols. These compounds and their utility for the synthsis of valuable esters, for example the O-(3,4,5-trimethoxybenzoyl)-methyl deserpidate or the O-(3,4-dimethoxybenzoyl)-methyl deserpidate, which show sedative and hypotensive activity and are therapeutically useful, and other analogous esters are described in my copending applications Serial No. 468,162, filed November 10, 1954, now abandoned, and Serial No. 471,519, filed November 26, 1954. Thus, deserpidic acid can be converted by reaction with diazomethane into methyl deserpidate, which by treatment with 3,4,5-trimethoxybenzoyl chloride or 3,4-dimethoxybenzoyl chloride respectively yields the above mentioned valuable esters.

Deserpidic acid lactone can be obtained in a convenient manner by splitting off the radical R together with the hydrogen atom indicated from the compounds of the formula:

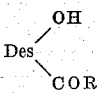

wherein "Des" has the aforesaid meaning and R stands for hydroxyl or a radical forming together with the carbonyl group a reactive functionally converted carboxyl group. Such a reactive functionally converted carboxyl group is, for example, a carbalkoxy group such as the carbomethoxy or the carbethoxy group. To effect the splitting off, for example, of a hydroxyl group together with the hydrogen atom there are used agents which split off water with lactone formation, such as acid anhydrides, for example, acetic acid anhydride, thionyl chloride, phosphorous trichloride, phosphorous oxyhalides or acid halides. In case of R being alkoxy the corresponding alcohol is split off to form the lactone, for example, by heating the compounds with or without solvents, preferably in the presence of a lactonizing catalyst such as an alcoholate, for example, aluminum phenolate or aluminum tertiary butoxide, or under other appropriate alkaline conditions. Thus the process of the invention consists in lactonizing deserpidic acid or its reactive functionally converted carboxyl derivatives.

Depending on the conditions employed, deserpidic acid lactone is obtained as the free base or in the form of its salts. From the salts the free base may be obtained. The free base can be converted into its salts by reaction with acids, e. g. inorganic or organic acids, such as hydrohalic acids, sulfuric acid, phosphoric acid, nitric acid, hydroxyethane sulfonic acid, toluene sulfonic acid, acetic acid, tartaric acid or citric acid.

The following examples will serve to illustrate the invention, the relationship of the parts by weight to the parts by volume being as the gram to the milliliter.

Example 1

To a solution of 0.13 part by weight of deserpidic acid in 40 parts by volume of dry, distilled pyridine is added 1 part by volume of acetic anhydride. After standing for 3 days at 5°, the solution is taken to dryness in vacuo. A small volume of toluene is added to the resulting froth and the solution evaporated to dryness in vacuo. The treatment with toluene is repeated twice. Crystallization of the frothy solid residue from acetone gives needles, M. P. 310–315°. A second crop of crystals is obtained from the concentrated mother liquor. The solvent is removed from the mother liquor of the second crop, and by crystallization from methanol a third crop of crystals is obtained. The three crops of crystals are combined, dissolved in methylene chloride and methanol, concentrated until a small volume of methanol remains. The lactone of deserpidic acid crystallizes as needles, M. P. 315,318°, and analyzes for $C_{21}H_{24}O_3N_2$. It shows the optical rotation and the infrared sepectrum given above.

It can be converted into deserpidic acid or its esters by hydrolysis or alcoholysis respectively. Thus by treating deserpidic acid lactone with an aqueous alkaline medium, such as aqueous methanolic potassium hydroxide solution, preferably at boiling point, neutralizing with acetic acid, evaporating the mixture to dryness, extracting the residue with acetone and crystallizing the residue obtained by evaporation of the acetone from methanol, there is obtained deserpidic acid melting at 270–273° (dec.). Alcoholysis is preferably carried out by treatment with an alcohol in the presence of a catalyst, such as a corresponding alcoholate. Thus, by boiling with sodium methylate in methanol deserpidic acid lacetone yields methyl deserpidate.

The deserpidic acid used as starting material can be obtained as follows:

To 1 part by weight of deserpidine in 20 parts by volume of methanol is added a solution of 2 parts by weight of potassium hydroxide in 10 parts by volume of water. This mixture is refluxed for 2 hours under an atmosphere of nitrogen. At the end of this period all the deserpidine is dissolved and the resulting solution is filtered through glass wool. After cooling, glacial acetic acid (3 parts by volume) is added to give the solution a pH of about 6. The solution is then evaporated in vacuo to a white, solid froth, which is triturated with 25 parts by volume of ether and filtered. The ether insoluble portion is similarly treated with two portions each of 25 parts by volume of ether. The white, ether-insoluble solid is triturated once with 100 parts by volume of acetone and then with 5 portions each of 50 parts by volume of acetone. After each trituration the mixture is filtered and the filtrates evaporated to dryness in vacuo. The white, solid froths thus resulting from the first four triturations are combined and crystallized from methanol, yielding white prisms, melting at 267–269° (dec.). The product is recrystallized by dissolving in a large volume of methanol and methylene chloride, filtering and concentrating until a small volume of methanol remains. After two such recrystallizations deserpidic acid is obtained in the form of white prisms melting at 270–273° (dec.) and analyzing for the empirical formula $$C_{21}H_{26}O_4N_2$$

Free deserpidic acid can be converted into its salts; thus, by treating with aqueous methanolic potassium hydroxide solution, filtering and adding ether to the obtained solution, there is obtained the potassium salt as a white powder. By treatment with acids such as nitric acid or hydrochloric acid, the corresponding acid addition salts are obtained. The alkaloid deserpidine used as starting material can be obtained according to the process described in my copending application Serial No. 454,597, filed September 7, 1954, now abandoned, for example as follows:

500 parts by weight of dried, finely ground roots of *Rauwolfia canescens* are extracted batch-wise with methanol at its boiling point, using the following volumes and times, and filtering each extract while hot: 2,000 parts by volume, 1 hour; 1,000 parts by volume, 45 minutes; 1,000 parts by volume, 30 minutes; 1,000 parts by volume, 30 minutes. The extracts are combined and evaporated in vacuo to 75 parts by volume of thick syrupy solution. After the addition of 75 parts by volume of methanol and 150 parts by volume of acetic acid of 15 percent strength with adequate mixing, the solution is extracted with 2 portions each of 100 parts by volume of hexane. The combined hexane extracts are extracted with 15 parts by volume of acetic acid of 15 percent strength. The latter extract is added to the above acetic acid phase which is then extracted with 3 portions each of 75 parts by volume and 1 portion of 50 parts by volume of ethylene chloride. The first 3 extracts are combined and washed with 60 parts by volume of 2 N sodium carbonate solution and then with 60 parts by volume of distilled water. These washing solutions are saved and used for the washing of the fourth and final ethylene chloride extract. The combined ethylene chloride extracts are dried over sodium sulfate, filtered and evaporated in vacuo to a constant weight of a tan, frothy solid. 1 part by weight of this residue is dissolved in 1.5 parts by volume of warm methanol and the solution cooled to 5° C. for 18 hours, whereby crystallization of reserpine sets in. After filtering from the crystallized reserpine and washing with cool methanol, the filtrate is freed of solvent in vacuo. 2 parts by weight of the resulting red-brown solid froth are triturated with 2 portions each of 25 parts by volume of benzene and filtered each time. The benzene insoluble material is saved for further treatment. The benzene soluble fraction is poured on to a column of 40 parts by weight of activated alumina (Woelm, activity grade I), which is then eluted first with 3 portions each of 50 parts by volume of benzene and then with 6 portions each of 50 parts by volume of benzene-acetone (9:1), the first of which benzene-acetone portions had been used for extraction of the above mentioned benzene insoluble material. The second of the 6 benzene-acetone elution fractions on removal of the solvents gives a light tan solid froth which on crystallization from methanol gives colorless prismatic needles of slightly impure deserpidine. Rechromatographing of 1 part by weight of this substance on 20 parts by weight of activated alumina (Woelm, activity grade I) using benzene and benzene containing 0.1 percent methanol as eluting agents followed by crystallization from methanol gives colorless prismatic needles of pure deserpidine, melting at 228–232° C.

Esters of deserpidic acid can be obtained, for example, in the following way:

Example 2

To 0.5 part by weight of deserpidine is added a solution of 0.05 part by weight of sodium in 25 parts by volume of methanol. The mixture is refluxed under nitrogen for one hour during which the deserpidine all dissolves. After cooling, the solution is concentrated in vacuo to a volume of about 10 parts by volume. 30 parts by volume of water are added and then concentrated hydrochloric acid in a dropwise manner until the solution is strongly acidic. It is then extracted with 15 parts by volume of ether and re-extracted with 3 portions each of 10 parts by volume of ether. The aqueous phase is then made basic with concentrated aqueous ammonia and extracted with 15 parts by volume of methylene chloride and re-extracted with 3 portions each of 10 parts by volume of methylene chloride. The combined methylene chloride extracts are dried over anhydrous potassium carbonate and concentrated in vacuo to give methyl deserpidate as a pale, yellow solid froth which analyzes for the empirical formula $C_{22}H_{28}O_4N_2$. In the same manner, by employing dry ethanol or butanol instead of methanol, the corresponding alkyl deserpidates are obtained.

0.33 part by weight of the above described methyl deserpidate is chromatographed on 5 parts by weight of alumina (Alcoa, acid washed; activity No. 3). A fraction eluted with 25 parts by volume of benzene containing 1 percent methanol gives, after removal of solvent, a non-crystalline residue. 0.03 part by weight of this is dissolved in 1.2 parts by volume of 10 percent acetic acid and a few drops of saturated sodium nitrate solution is added. After standing at room temperature several days, the crystalline material is filtered. This is recrystallized from methanol to give prisms of the nitric acid salt of methyl deserpidate, which melts at 271–276° and analyzes for $C_{22}H_{28}O_4N_2 \cdot HNO_3$. Other salts, which can be obtained from methyl deserpidate are, for example, those with hydrochloric acid, sulfuric acid, phosphoric acid, acetic acid, tartaric acid, citric acid, hydroxy ethane sulfonic acid, toluene sulfonic acid and the like.

Methyl deserpidate can also be obtained from deserpidic acid by reaction with diazomethane in methanolic solution. In the same manner, using diazoethane, ethyl deserpidate can be obtained; using other diazoalkanes, such as diazopropane or -butane, the corresponding esters are obtained. Instead of employing diazoalkanes, the alcohols in the presence of an acid catalyst such as hydrochloric acid may be employed to esterify the deserpidic acid. The esterifying agent may be employed in equivalent amounts or in excess.

By boiling methyl deserpidate in a solution of sodium hydroxide in aqueous methanol under an atmosphere of nitrogen and working up as described in Example 1, there is obtained deserpidic acid, melting at 270–273° (dec.).

Example 3

A suspension of 0.07 part by weight of deserpidic acid lactone in 2 parts by volume of methanol and 2 parts by volume of water containing 0.1 part by weight of potassium hydroxide is refluxed for one-half hour, during which complete solution is obtained. To the cooled solution is added glacial acetic acid to give a pH of about 6. The solvents are removed in vacuo, and the residue dried by distilling toluene three times from the solid residue, which is then triturated with two portions each of 10 parts by volume of acetone. The combined acetone extracts are evaporated to dryness and the residue is crystallized from methanol to give deserpidic acid, melting at 270–273° (dec.).

What is claimed is:

1. A compound of the group consisting of deserpidic acid lactone and acid addition salts thereof.
2. Deserpidic acid lactone.
3. A process which comprises treating deserpidic acid lactone with an aqueous alkaline medium so as to produce deserpidic acid.
4. A process which comprises treating deserpidic acid lactone with an aqueous methanolic potassium hydroxide solution so as to produce deserpidic acid.
5. A process which comprises treating deserpidic acid lactone with a lower alkanol in the presence of a catalyst so as to produce the corresponding ester of deserpidic acid.
6. A process according to claim 5, wherein the catalyst is a corresponding alcoholate.
7. A process which comprises treating deserpidic acid lactone with methanol in the presence of a methylate so as to produce methyl deserpidate.
8. A process which comprises treating deserpidic acid lactone with a lower alkanol so as to produce the corresponding ester of deserpidic acid.

References Cited in the file of this patent

Cerletti et al.: Experientia, vol. XI, pp. 98–99 (Mar. 15, 1955).

Schlittler et al.: Experientia, vol. XI, pp. 64–65 (Feb. 15, 1955).